Oct. 7, 1969 M. R. KUEHNLE 3,471,842

MAGNETIC TAPE INPUT DEVICE

Filed Dec. 22, 1964 5 Sheets-Sheet 1

INVENTOR.
MANFRED R. KUEHNLE
BY
Philip J. McFarland
ATTORNEY

INVENTOR.
MANFRED R. KUEHNLE
BY
Philip J McFarland
ATTORNEY

INVENTOR.
MANFRED R. KUEHNLE
BY
Philip J. McFarland
ATTORNEY

Oct. 7, 1969 M. R. KUEHNLE 3,471,842

MAGNETIC TAPE INPUT DEVICE

Filed Dec. 22, 1964 5 Sheets-Sheet 4

INVENTOR.
MANFRED R. KUEHNLE
BY
Philip G. McFarland
ATTORNEY

INVENTOR.
MANFRED R. KUEHNLE

Philip J McFarland
ATTORNEY

United States Patent Office 3,471,842

Patented Oct. 7, 1969

3,471,842

MAGNETIC TAPE INPUT DEVICE

Manfred R. Kuehnle, Lexington, Mass., assignor to DASA Corporation, Andover, Mass., a corporation of California Filed Dec. 22, 1964, Ser. No. 420,334
Int. Cl. G11b 5/62
U.S. Cl. 340—174.1 4 Claims

ABSTRACT OF THE DISCLOSURE

For use in data processing systems, an input device for storing alpha-numeric data in the form of pulses on a magnetic tape. Data is stored in data tracks disposed transverse of the tape and a mechanism is provided for precisely scanning a data track with a magnetic transducer and automatically advancing the tape to a succeeding data track at the conclusion of each transverse scan.

This invention pertains generally to systems for processing data and particularly to input devices associated with such systems.

It is known in the art that some kind of code conversion apparatus is often required to match the characteristics of input devices to their associated data processing systems. It is also known in the art that manual and automatic input devices may be combined to compose desired input signals for data processing systems. For example, a code conversion apparatus used to match the characteristics of an input device to a data processing system and to permit composition of input signals by manually and automatically operated input devices is shown and described in the system covered by the application for patent entitled "Methods and Apparatus Relating to Information Transfer Devices" by Robin C. Moseley, Ser. No. 343,609, filed Feb. 10, 1964, now Pat. No. 3,363,030, and assigned to the same assignee as this application. In the cited application, a manually operated input device, as a conventional teletypewriter keyboard, and an automatic input device, as a magnetic recorder, may be used in combination to compose input signals to a conventional teletype transmitter for transmission to a remotely located teletype receiver.

The particular automatic input device, an automatic telephone dialer, utilized by Moseley is fully described in the application for patent of George S. Lockwood et al. entitled "Equipment and Methods for Automatic Electronic Telephone Dialing" Ser. No. 249,223, filed Jan. 3, 1963, now Pat. No. 3,321,584, and assigned to the same assignee as this application. Such a dialer comprises a magnetic tape upon which digital information, in the form of conventional dialing pulses representing selected telephone numbers, may be magnetically recorded, such tape also being adapted to support a written indicium of each of the telephone stations corresponding to each one of the selected telephone numbers.

Experience has proven that, even though the just-mentioned dialer may be adequate for the purpose of storing teletype messages, special precautions are necessary to overcome problems peculiar to teletype systems. For example, since the tolerances in parameters such as pulse shape and spacing are much less critical in telephone applications than in teletype applications, the mechanical and electrical variations inherent in operation of the described dialer must be compensated to obtain satisfactory operation. In the just-described dialer, the required compensation has been accomplished by rather complex electronic compensators. Experience has also proven that, to attain a requisite degree of flexibility in operation, a satisfactory input device for teletype applications must be adapted to handling message elements of varying lengths. For example, if it is desired that names and addresses of selected individuals are to be stored for transmission when called for, then the input device must be capable of automatically causing the teletype transmitter to step from one line to another. On the other hand, if it is desired to control a teletype transmitter so that only a portion of a single line is automatically transmitted, the input device must be capable of so doing without attention from an operator. No known input device of the character here being discussed has the requisite flexibility.

Therefore, it is an object of this invention to provide an improved input device which is particularly adapted to use in telephonic or non-telephonic communication systems.

Another object of this invention is to provide an improved input device which does not require special circuits to compensate for variations in mechanical and electrical tolerances.

Still another object of this invention is to provide a data processing system utilizing an improved input device which also controls the synchronization of any required code converter.

Still another object of this invention is to provide an improved data processing system utilizing an input device which is adapted automatically to introduce into the system messages of length which may vary between extremely broad limits.

These and other objects of this invention are met generally by providing, in a data processing system (which is otherwise made up of conventional elements), an input device which is adapted to storing alpha-numeric messages as binary pulses on a magnetic storage medium, the address and content of each message being written in human readable form on the storage medium, means for indexing the storage medium to place any selected message at an indicium, and means for reading out the stored alpha-numeric messages and for converting the resulting signals to an encoded signal to actuate an output device. Further, the contemplated input device includes means for synchronizing the encoding means with the means for reading out any selected message. Thus, all mechanical and electrical errors due to deviations from normal of any part of the input device are, for all practical purposes, eliminated without resort to electrical compensation circuits. For a more complete understanding of this invention, reference is now made to the following detailed description of a preferred embodiment of this invention as illustrated in the attached drawings in which:

Figure 1:
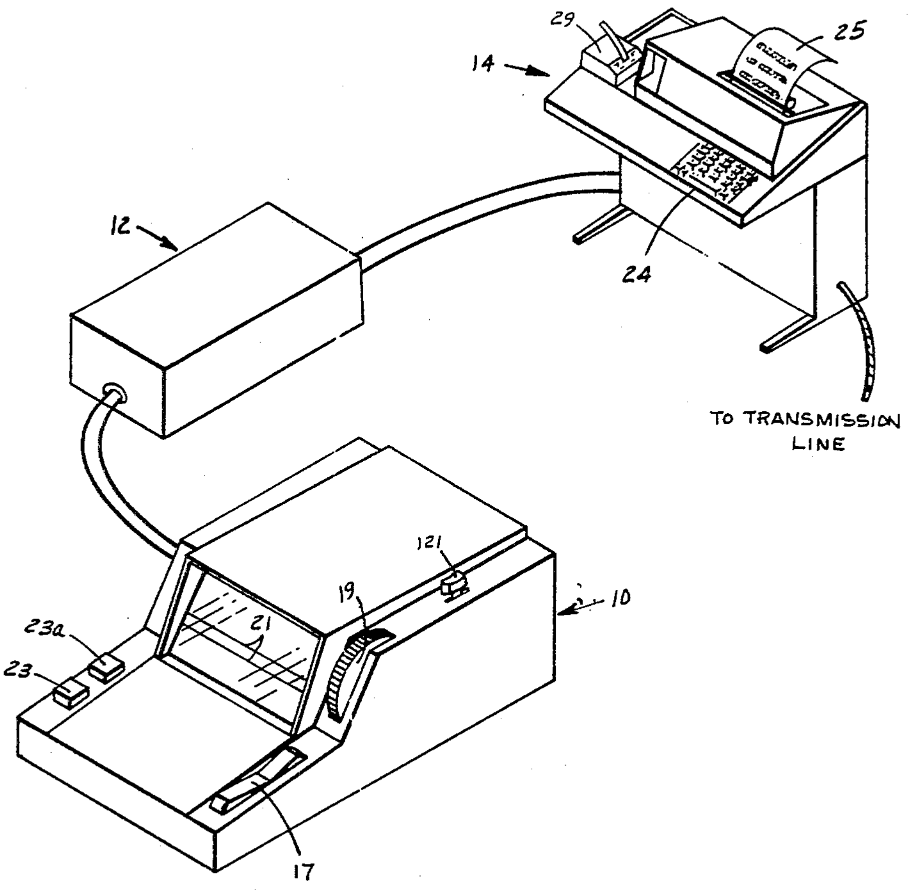
FIG. 1 is an outline drawing of a system according to this invention, showing an input device in conjunction with an output device as a conventional teletypewriter.

Referring now to FIG. 1, it may be seen that a system according to a preferred embodiment of this invention comprises an automatic dialer 10 connected through a control and conversion unit 12 to a conventional Teletype transmitter/receiver 14. The latter, in turn, is connected by an appropriate cable (not numbered) to a transmission line in circuit with one or more similar Teletype transmitter/receivers (not shown) to complete a communication network.

The automatic dialer 10 preferably is one of the type shown and described in the Lockwood et al. application mentioned hereinbefore, but modified as described hereinafter. Suffice it to say now that the automatic dialer 10 includes a tape-like record medium (not numbered), means controlled by a reversing switch 17 or a manually actuated wheel 19 to index such record medium at an indicium (shown here as lines 21 across a window in the face of the automatic dialer 10) and means selectively controlled by switches 23, 23*a* to actuate a magnetic transducer (not here shown) to record messages composed on a conventional teletypewriter keyboard 24. A conventional printed copy 25 and a punched tape 27 are also produced by actuation of the teletypewriter keyboard 24. Thus, each message may be edited and corrected whenever necessary. The punched tape 27 is fed through a conventional tape reader 29 to produce encoded signals in, say, Baudot code representative of the composed message. This signal is fed to the control and conversion unit 12, wherein, it is converted to a form suitable for magnetic recording say to a conventional NRZ code, and then applied to the magnetic transducer in the automatic dialer 10. When it is desired to read out any stored message, the process is simply reversed.

Figure 2:
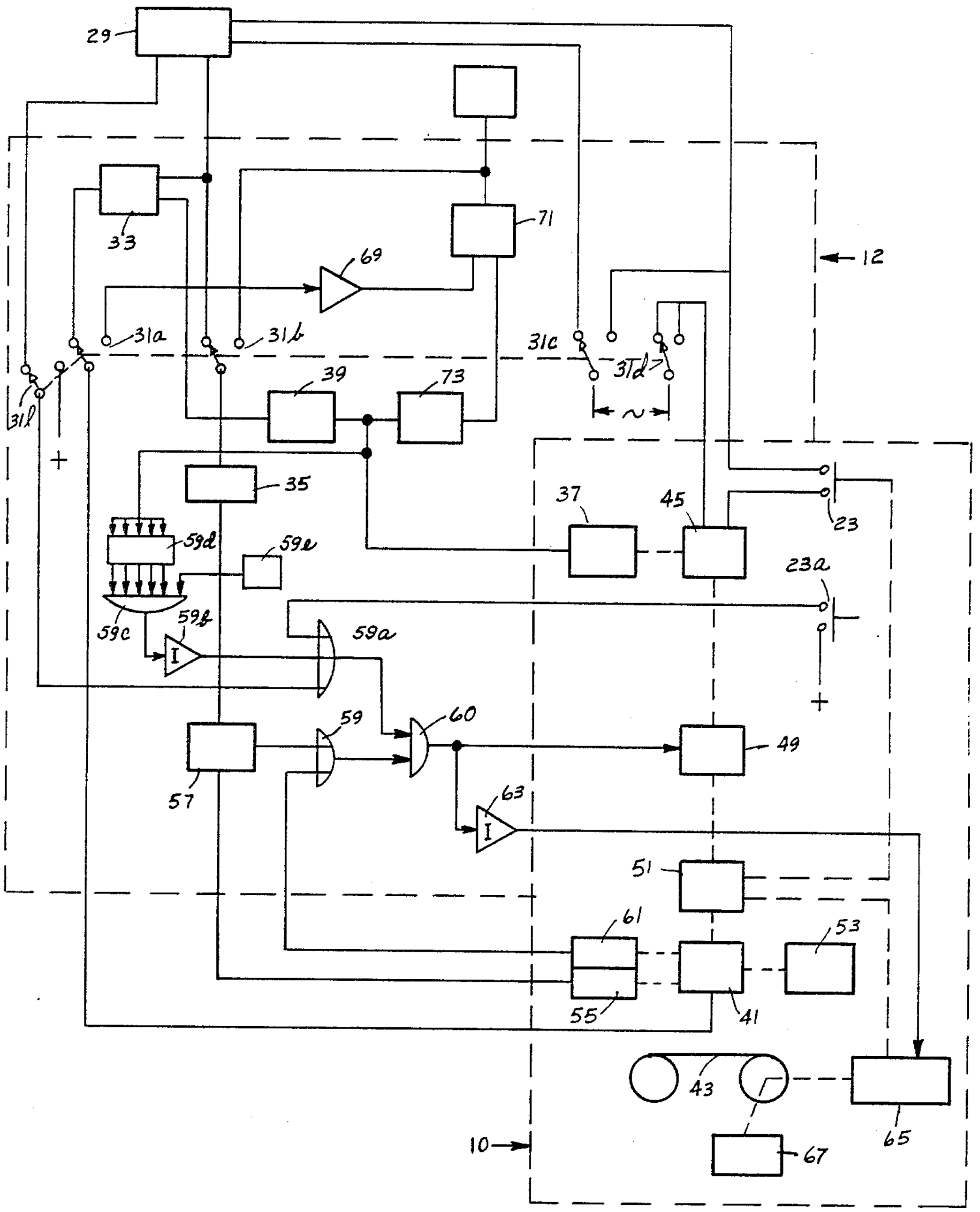
FIG. 2 is a block diagram of the control and conversion circuit shown in FIG. 1.

Referring now to FIG. 2, it may be seen that the control and conversion unit 12 operates either as an encoder or a decoder, depending on the position of ganged switches 31A, 31B, 31C, 31D, 31E. When the switches are in the position shown, encoding is effected. That is, the coded signal out of the tape reader 29 is fed to a flip flop 33, and through switch 31B, to a character gate generator 35. The latter element preferably is a conventional unistable multivibrator having an astable state which is slightly less than the length of a character out of the tape reader 29. Consequently, only the first bit in each character out of the tape reader 29 may trigger the character gate generator 35. Further, the flip flop 33 is, as is conventional, set or reset by pulses from a clock pulse generator 37 (described hereinafter) via a quarter bit delay circuit 39. The latter circuit may be a conventional unistable multivibrator having an astable state approximately equal to one quarter of the length of each bit in the code out of the tape reader 29. The flip flop 33, then, produces a conventional NRZ coded signal corresponding to, but delayed by one quarter of a bit from, the signal out of the tape reader 29. Such signal is then passed through the switch 31A to a transducer 41 to be recorded on the record medium 43.

It is manifest that means to attain a proper relative motion between the transducer 41 and its associated record medium 43 must be provided whenever signals are to be recorded in the automatic dialer 10. Such motion is here attained by driving the transducer 41 at a substantially constant speed transversely of the record medium 43 (when signals are fed from the tape reader 29) until the transducer 41 reaches a preselected point adjacent to one side of the record medium 43. To accomplish this end, a transducer drive and timing motor 45 is energized and the tape reader 29 is started when the "start" switch 23, a transducer return spring 53 causes the transducer 41 to fly back to a "home" position to a "beginning of line switch" 55 disposed in any convenient manner adjacent to such "home" position. The signal produced by the last named switch is fed to a character counter 57 to reset the count therein to zero. The output signal of the character gate generator 43 then is counted to produce an enabling signal out of the character 57 until after, say 40 characters have been counted by the character counter 57. That enable signal is fed through an OR gate 59 to an AND gate 60 and thence to the electromagnetic clutch 49. The second input signal to the OR gate 59 is derived from an "end of line" switch 61 disposed to be actuated by movement of the transducer 41 to the preselected point adjacent one side of the record medium 43.

The AND gate 60 is enabled by a signal from an OR gate 59A, which element in turn is fed by a gating signal from the tape reader 29 (such signal preferably being the control signal for the drive motor, not shown, in the tape reader 29) or by a switch 23A, or by a control signal from an inverter 59B. The control signal from the latter is determined by a conventional digital coincidence circuit comprising a diode matrix 59C which produces a positive signal output when the signal in a conventional shift register 59B coincides with the signal out of a conventional switch matrix 59E. Thus, AND gate 60 normally is enabled, and the electromagnetic clutch 49 is energized, whenever the tape reader 29 is actuated and the number of characters out thereof is less than the number set in the character counter 57. When, however, it is desired to stop automatic transmission of a message, as when it is required to insert new data, a character indicating "stop" is inserted in the shift register 59D. The coincidence between the shift register 59D and the switch matrix 59E then causes AND gate 60 to be disabled and the electromagnetic clutch 49 to be deenergized. The switch 23A, obviously, permits the AND gate 60 to be enabled, and the electromagnetic clutch 49 to be energized, at any desired time, as when it is desired to clear a recorded line after the end of a message.

The output of the AND gate 60 is also fed through an inverter 63 to a line step mechanism 65, described in detail hereinafter. The latter mechanism, when actuated by a signal indicative of the end of a recorded line, decouples the mechanical clutch 51 thus permitting the transducer 41 to be returned to its "home" position under action of the transducer return spring 53, and then automatically advances the record medium 43 to its next line. Therefore, if a message is not completely recorded when the transducer 41 actuates the "end of line switch" 61, the transducer 41 is moved to the beginning of the next line on the record medium 43 and recording continues. To complete the illustrated system, a conventional line selector 67 operative on a feed spool (not numbered) and the mechanical clutch 51 permits rapid search in either direction, to locate any desired line on the record medium 43.

When recorded signals are to be read from the record medium 43, the line selector 67 is actuated properly to position the transducer 41 adjacent to the record medium 43, the switches 31A, 31B, 31C, 31D, 31E, are thrown to their right hand position and the "start" switch 23 is actuated. The transducer drive and timing motor 45 is therefore energized as shown and the transducer 41 is moved to its "home position" to actuated the "begining of line switch" 55. The transducer 41, is as described above, then moved across the record medium 43 and the recorded signals are passed from the transducer 41 to the switch 31A and thence, by way of an amplifier 69, to a flip-flop 71. The output signal of the latter is divided, one portion being led to the transmitter portion of the Teletype transmitter/receiver 16 of FIG. 1 and the other portion being led through switch 31B to the character gate generator 45. At the same time, the output of the clock pulse generator 37 is fed through a conventional three-quarter bit delay circuit 73 to the flip-flop 71. Thus, it may be seen that the NRZ signal recorded in the record medium 43 is converted back to a Baudot coded signal and the character gate generator 45 is energized in the same manner as described above.

It should be noted here that it is a feature of this invention to ensure proper synchronization of the signals out of the transducer 41 with the clock pulses so as to eliminate loss of any information. That is, even though the speed of the transducer drive and timing motor 45 may vary for one reason or another, any variation equally affects the clock pulse generator 37 and the speed at which the transducer 41 moves across the record medium 43. Thus, on readout, it is impossible to lose any information due to loss of synchronization between the clock pulses and the rate at which individual bits of information are generated since interchangeable cartridges of the type used in the so-called "Magicall" repertory dialer, Model E-2, manufactured by DASA Corporation, Andover, Mass., are contemplated to hold the record medium 43.

Figure 3:
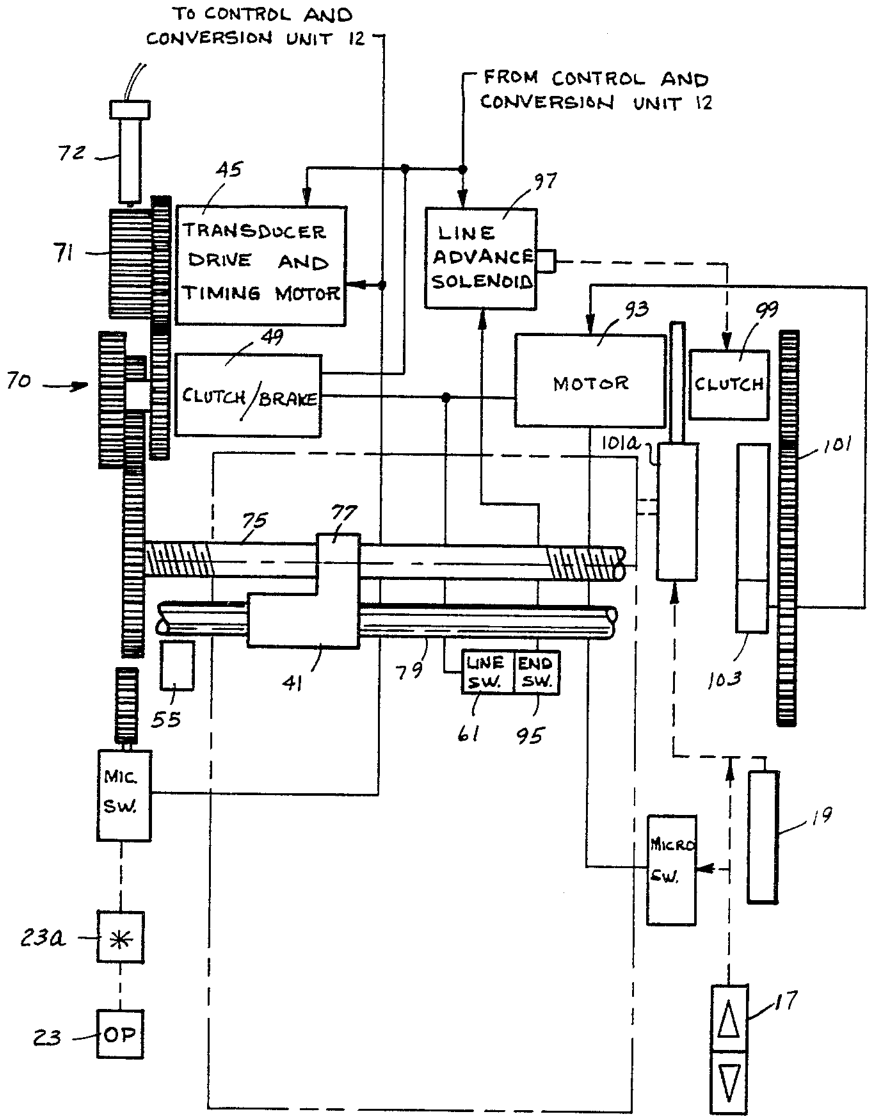
FIG. 3 is a simplified layout of the transducer control and drive mechanism used in the input device shown in FIG. 1.
Figure 4:
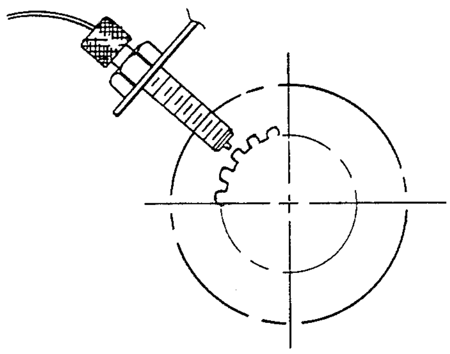
Figure 5:
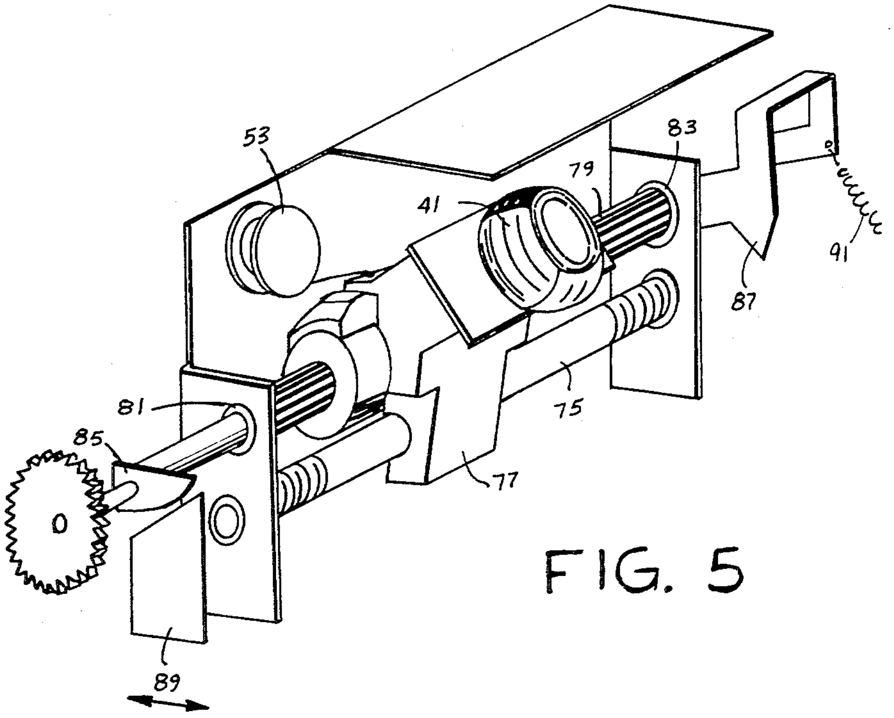

Referring now to FIGS. 3, 4, and 5 in particular, it may be seen that the transducer drive and timing motor 45 simultaneously drives a gear train indicated generally by the numeral 70 and a serrated wheel 71. The latter may be made from any ferromagnetic material. A magnetic transducer 72 is mounted, as shown in FIG. 4, adjacent to the serrated wheel 71. It is evident that, as the serrated wheel 71 is rotated, pulses of electric current (or "clock" pulses) are induced in the magnetic transducer 72. Such induced pulses are then led by appropriate leads (unnumbered) to the input terminals of the one-quarter and three-quarter bit delay circuits 39, 73 of FIG. 2. It will be apparent now that the speed of rotation of the transducer drive and timing motor 45 and the number of serrations formed on the periphery of the serrated wheel 71 may be chosen so that the repetition rate of the clock pulses may be matched to the bit rate of information from the tape reader 29 of FIG. 2. It will also be apparent that, if preferred, the rate at which clock pulses are generated may be much higher than such bit rate and appropriate dividers incorporated in circuit with the magnetic transducer 72 to accomplish the desired matching of rates.

The gear train 70, as shown in FIG. 3 ultimately operates (when the electromagnetic clutch 49 is engaged) to drive a lead screw 75 and a lead screw nut 77. It is highly desirable that there be a very large reduction in speed between the speed of rotation of the transducer drive and timing motor 45 and the lead screw nut 77, driven by the lead screw 75. At the same time, it is necessary that means be provided to permit easy engagement and disengagement of the lead screw nut 77 from the lead screw 75. To effect both purposes, the pitch of the lead screw 75 is made small, its thread is of the buttress type and the lead screw nut 77 is a half nut complementary to the lead screw 75. The lead screw nut 77 is formed integrally with the transducer 41 on a common base (not numbered). An opening, complementary in shape to a splined shaft 79, is formed through the base. The splined shaft 79 in turn, is journaled in bearings 81, 83. A plate 85 having an inclined plane surface as shown and a pawl 87 are affixed to either end of the splined shaft 79 in any convenient manner. A mating plate 89, movable as shown by the arrows in the lower left portion of FIG. 5 in response to actuation of the "start" switch 23 of FIG. 2, moves the plate 85, finally to rotate the splined shaft 79 and the elements mounted thereon. Rotation of the splined shaft 79 then, disengages the lead screw nut 77 from the lead screw 75, thus permitting the transducer return spring assembly 53 to return the transducer 41 to its "home" position while the transducer drive and timing motor 45 is coming up to its operating speed. As soon as the mating plate 89 is moved away from the plate 85, then the lead screw nut 77 is moved back into engagement with the lead screw 75 such reengagement being forced by a spring 91 attached to the pawl 87 as shown.

Figure 6:
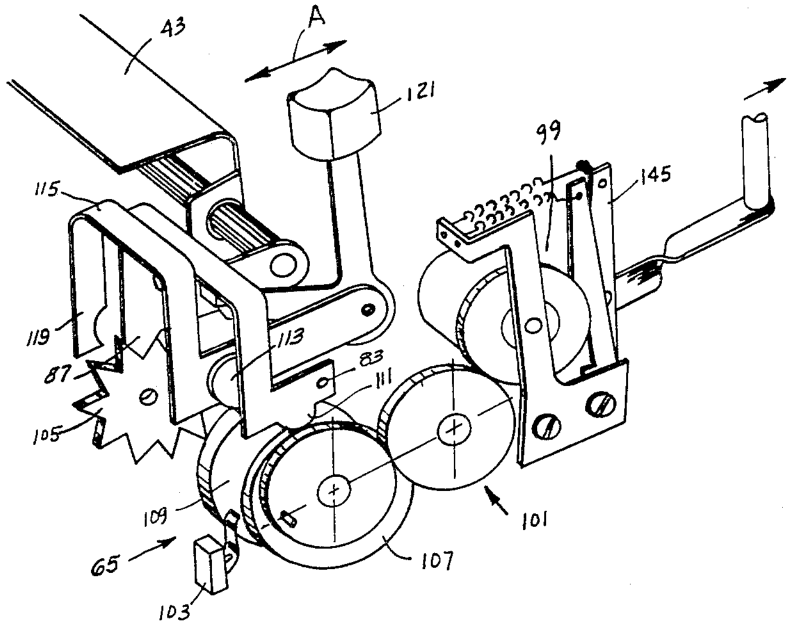
FIGS. 4, 5, 6 and 7 are more detailed reviews of portions of the transducer control and drive mechanism shown in FIG. 3.

Referring now to FIGS. 3 and 6, the preferred mechanism for automatically advancing the record medium may be seen to include a motor 93 which is energized when the "end of line" switch 61 is actuated by the transducer 41. A second switch 95 is disposed to be actuated approximately one hundred milliseconds after the "end of line" switch 61 to energize a line advance solenoid 97. The latter element, in turn, is mechanically linked to a one turn clutch 99 coupling the motor 93 to a gear train 101. The line advance mechanism 65 and a motor stop switch 103 in turn are actuated in response to movement of the last gear in the gear train 101, to move a serrated drive wheel 105, thereby finally to advance the record medium one line.

The line advance mechanism comprises cams 107, 109 rotatable with the last gear in the gear train 101 and supporting, respectively, cam followers 111, 113. Pawl

87, has a formed end portion complementary in shape to the serrations in the serrated wheel 105, and is, by means of the spring 91 normally held in position between a pair of such serrations. Consequently, the serrated wheel 105, and is normally restrained from rotation, with the result that the record medium is held in a fixed position. When, however, the cam 107 is rotated, cam follower 111 and the pawl 87 are moved against the force of the spring 91, upwardly to permit the serrated wheel 105 to be rotated. It should be noted here that, as shown in FIG. 5, the upward movement of the pawl 87 also causes rotation of the splined shaft 79 to lift the transducer 41 out of contact with the record medium and to disengage the lead screw nut 77 to permit movement of the transducer to a "home" position.

Movement of the last gear in the gear train 101 also causes rotation of the cam 109 with subsequent movement of the cam follower 113 and a pawl 115 against the force of a spring 117. The free end 119 is moved into contact with an underlying one of the teeth of the serrated wheel 105, causing that element to rotate through an angular distance somewhat more than one half the angular distance between adjacent teeth thereon. As a result, then, continued rotation of the last gear of the gear train 101 causes the formed end portion of the pawl 87 to move downwardly into position between the next pair of teeth in the serrated wheel 105 to complete movement thereof and to lock that element in its new position.

It is, on occasion, desirable to move the record medium independently of the just described line advance mechanism. In such an event, the pawl 87 is disengaged from the serrated wheel 105 and the transducer 41 is lifted from the record medium and the reversing switch 17 or manually actuated wheel 19 (see FIGS. 1 and 2) are operated as required. Disengagement of the pawl 87 and the transducer 41 are effected by a bell crank 121 having a protuberance 123 affixed thereto. When the bell crank 121 is moved in the direction of the arrow A, the protuberance 123 is pressed against the pawl 87 lifting that element as described hereinbefore with the result that the splined shaft 79 (FIG. 5) is rotated to disengage the lead screw nut 77 and the transducer 41. The reversing switch 17 or the manually actuated wheel 19 may then be operated to actuate a conventional gear train **101*a* (FIG. 3) to move the record medium 43** as desired.

Figure 7:
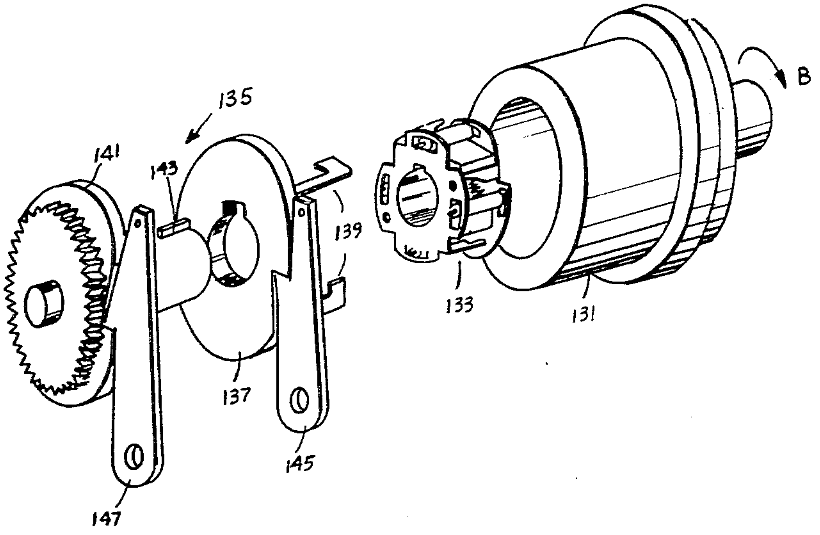

The one turn clutch 99 is shown in FIG. 7 to comprise a housing 131 rotated whenever the motor 93 is energized, a roller assembly 133, and an actuator assembly 135 which, when the roller assembly 133 engages the housing 131, rotates the first of the gears of the gear train 101 (FIG. 3). The roller assembly 133 consists of a central cam block, a plurality of rollers and springs and retainers as shown. The actuator assembly 135 consists of a plate 137 having a notch formed in its periphery as shown and supporting a plurality of fingers, two of which are shown at 139, projecting inwardly to bear against the rollers in the roller assembly 133, and a plate 141, also having a notch formed in its periphery and supporting a keyed shaft 143 which fits through an opening in the plate 137 to mate with a keyed journal in the roller assembly 133. Dogs 145, 147 normally are springily urged into contact with plates 137, 141 as shown. It may be seen that, when the dogs 145, 147 lie in the notches in the plates 137, 141 as illustrated and the housing 131 is rotated in the direction by the arrow B, fingers 139 contact the rollers to compress the springs and the keyed shaft 143 locks the roller assembly 133 so that the springs therein remain compressed. Further, each of the rollers is positioned on a surface of the cam block where the spacing between such surface and the inside of the housing 131 is slightly larger than the diameter of the roller. This means that rolling contact is made between the rollers and the inside of the housing 131 and a "free wheeling" condition exists.

When the dog 145 is moved in response to energization of the line advance solenoid 97 (FIG. 3), the springs in the roller assembly force each of the rollers along the cam block to a position where the spacing between the cam block and the inside of the housing 131 is equal to the diameter of the rollers. In such condition, frictional forces are generated to prevent the rollers from rotating, thus coupling the roller assembly 133, the actuating assembly 135 and the first gear of the gear train 101 to the housing 131. After one turn has been completed, however, dogs 145, 147 reengage to place the elements in the roller assembly 133 back into their originally described condition wherein housing 131 rotates independently of the remaining parts of the clutch 99 until the switch 103 is actuated to deenergize the motor 93.

Although the preferred embodiment of this invention incorporates means for recording in the known NRZ code, it is not essential that such a code be used. For example, the Baudot code out of a conventional tape reader could be recorded directly. When such recorded signals are read out, however, it would still be necessary to convert the output signal to Baudot code. The required conversion, however, is simply accomplished by feeding the signal into a conventional flip-flop in such a manner that pulses of one polarity "set" the flip-flop and pulses of the opposite polarity "reset" the flip-flop. It follows from the foregoing that it is not necessary to utilize the described synchronization means (or clock pulses) when the signal into the transducer is in its original code. In a practical case this means that the clock pulse generator and the components energized thereby may be eliminated. It should also be noted that it is not essential to the invention to utilize the illustrated and described automatic line advance mechansm, since the contemplated dialer has means for accomplishing tape movement independently of the automatic line advance mechanism.

Still further, it should be noted that the utilization device with which the contemplated input device may be used is not limited to teletypewriters. That is, a device according to this invention may be connected to different apparatus, as a computer. In this connection it should be noted that a conventional serial-to-parallel converter, as a shift register, may be inserted in circuit in the output of the contemplated device. It is felt, therefore, that this invention should not be restricted to its disclosed embodiment but, rather, should be limited only by the spirit and scope of the appended claims.

What is claimed is:

1. An input device adapted to store alpha-numeric data in the form of pulses on a magnetic storage tape comprising:

means for moving a magnetic transducer across the width of said tape thereby to record data on or read data from said tape, said means including:
- a first electric motor;
- an electromagnetic clutch;
- a lead screw disposed along the width of said tape and orthogonal to the direction of movement of said tape and mounted for rotation about its axis;
- a first gear train coupling said first motor, said clutch and said lead screw;
- said first motor being operative with said first gear train to rotate said lead screw when said clutch is engaged;
- a splined shaft disposed parallel to said lead screw and mounted for rotation about the axis of said shaft and having a magnetic transducer slidably mounted thereon;
- a half nut integrally attached to said transducer and having a thread adapted to mate with the thread of said lead screw, whereby said transducer is movable along the axis of said lead screw upon rotation thereof;

- first spring means urging said half nut into engagement with said lead screw;
- second spring means urging said transducer to a home position at one end of said splined shaft when said lead screw and half nut are disengaged;
- a beginning-of-line switch adapted to be mechanically actuated by said magnetic transducer when said transducer is disposed at said one end of said splined shaft;
- an end-of-line switch adapted to be mechanically actuated by said magnetic transducer when said transducer is disposed at the other end of said splined shaft;
- a third switch adapted to be actuated a predetermined time after actuation of said end-of-line switch;
- means for applying a signal to said electromagnetic clutch to cause rotation of said lead screw and movement of said magnetic transducer across the width of said tape;

means for longitudinally advancing said storage tape to a succeeding data position automatically after said magnetic transducer has scanned the width of said tape, said advancing means including:
- a second electric motor operative upon actuation of said end-of-line switch;
- a second gear train;
- a one-turn clutch coupling said motor to said second gear train;
- a cam system connected to said second gear train;
- a serrated wheel coupled to said second gear train and adapted to drive said storage tape;
- a pawl urged into engagement with said serrated wheel to thereby prevent rotation thereof;
- a follower coupled to said splined shaft and cooperate with said cam system to move said pawl out of engagement with said serrated wheel and to rotate said splined shaft, thereby to disengage said lead screw and said half nut; and
- a solenoid connected to said one-turn clutch and operative in response of actuation of said third switch to engage said one-turn clutch, whereby said serrated wheel is rotated to advance said tape to a succeeding data position.

2. An input device according to claim 1 wherein said lead screw has a thread pitch substantially equal to the distance between the first digit of each character recorded on said tape.

3. An input device according to claim 1 further including a serrated ferromagnetic wheel coupled for rotation by said first electric motor, and a magnetic transducer disposed adjacent the periphery of said serrated ferromagnetic wheel and operative to produce clock pulses in response to rotation of said ferromagnetic wheel.

4. An input device according to claim 1 wherein said one-turn clutch includes:
- a cylindrical housing affixed to and concentric with a driving shaft to rotate therewith;
- an end element affixed to the coaxial driven shaft and disposed within the cylindrical housing, the end element having a plurality of substantially planar surfaces formed thereon and facing the inner surface of the cylindrical housing;
- a plurality of roller bearings each being disposed between a separate one of the substantially planar surfaces and the inner surface of the cylindrical housing, the diameter of each roller bearing being greater than the least, but less than the greatest distance between each substantially planar surface and the inner surface of the cylindrical housing;
- a first standard affixed adjacent to an end of each substantially planar surface;
- a spring disposed between the first standard and the roller bearing on each substantially planar surface;
- a first substantially circular plate rotatably mounted on the driven shaft;

a second standard affixed to the first substantially planar surface in contact with the roller bearing thereof;

a second substantially circular plate affixed to the driven shaft;

means, including first and second pawls coacting, respectively, with said first and second substantially circular plates at a single point thereon to lock the roller bearings in decoupled position; and means for selectively disengaging said first and second pawls during one revolution of the driven shaft.

References Cited

UNITED STATES PATENTS

| | | | |
|---|---|---|---|
| 2,998,494 | 8/1961 | Nations | 179—100.2 |
| 3,070,800 | 12/1962 | Brown et al. | 340—174.1 |
| 3,124,645 | 3/1964 | Whitney | 178—17.5 |
| 3,176,083 | 3/1965 | Hauser | 340—174.1 |

BERNARD KONICK, Primary Examiner

B. L. HALEY, Assistant Examiner

U.S. Cl. X.R.

179—100.2; 192—33